(12) United States Patent
Ramavarjula et al.

(10) Patent No.: US 10,769,638 B2
(45) Date of Patent: *Sep. 8, 2020

(54) BANK ACCOUNT NUMBER VALIDATION

(71) Applicant: Visa International Service Association, San Francisco, CA (US)

(72) Inventors: Bharathi Ramavarjula, Palo Alto, CA (US); Nimesh Parikh, Salem, NH (US); Timothy Wright, Buckley, WA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 15/811,107

(22) Filed: Nov. 13, 2017

(65) Prior Publication Data
US 2018/0068319 A1 Mar. 8, 2018

Related U.S. Application Data

(63) Continuation of application No. 14/322,653, filed on Jul. 2, 2014, now Pat. No. 9,846,879.
(Continued)

(51) Int. Cl.
G06Q 20/42 (2012.01)
G06Q 20/32 (2012.01)
G06Q 20/40 (2012.01)

(52) U.S. Cl.
CPC ....... *G06Q 20/425* (2013.01); *G06Q 20/3255* (2013.01); *G06Q 20/3274* (2013.01); *G06Q 20/4016* (2013.01)

(58) Field of Classification Search
None
See application file for complete search history.

(56) References Cited

U.S. PATENT DOCUMENTS 8,433,127 B1 4/2013 Harpel et al.
8,645,241 B2 2/2014 Rodriguez et al.
(Continued)

FOREIGN PATENT DOCUMENTS

WO 02095589 11/2002
WO WO 2014/028769 A2 * 8/2013

OTHER PUBLICATIONS

"The Credit Card Visual Authentication Scheme Based on GF(28) Field" by Feng Wang, Multimedia Tools and Applications, vol. 74, Issue 24, Dec. 2015, pp. 11451-11465.
(Continued)

*Primary Examiner* — Alexander G Kalinowski
*Assistant Examiner* — Blane A Lickteig
(74) *Attorney, Agent, or Firm* — Kilpatrick Townsend & Stockton LLP

(57) ABSTRACT

A method for validating payment information for an online transaction is provided. A payment server can receive two representations of the same payment information. The payment information can be validated if it is determined that the two representations match. If there is no match, or the payment information is otherwise invalid, the payment information can be repaired based on a trusted representation of the payment information, such as stored payment information or an image of an associated value token. Payment information can be received via one or more communication channels, and can be provided by one or more consumer devices. A merchant service provider can validate payment information and handle transaction processing on behalf of a merchant.

13 Claims, 8 Drawing Sheets

Related U.S. Application Data

(60) Provisional application No. 61/843,760, filed on Jul. 8, 2013.

(56) References Cited

U.S. PATENT DOCUMENTS

| | | |
|---|---|---|
| 2003/0172030 A1 | 9/2003 | Volgunin |
| 2006/0049242 A1 | 3/2006 | Mejias |
| 2006/0129485 A1* | 6/2006 | Hamzy ................ G06Q 20/102 |
| | | 705/40 |
| 2007/0215691 A1* | 9/2007 | Swift .................. G06Q 20/042 |
| | | 235/379 |
| 2009/0024520 A1 | 1/2009 | Drory et al. |
| 2009/0173784 A1 | 7/2009 | Yang et al. |
| 2010/0074509 A1 | 3/2010 | Laaser |
| 2011/0055061 A1* | 3/2011 | Yee ....................... G06Q 20/14 |
| | | 705/34 |
| 2012/0284185 A1* | 11/2012 | Mettler ................. G06Q 40/02 |
| | | 705/44 |
| 2012/0292388 A1* | 11/2012 | Hernandez .......... G06Q 20/108 |
| | | 235/379 |
| 2013/0204783 A1 | 8/2013 | Klose |
| 2013/0219479 A1 | 8/2013 | DeSoto et al. |
| 2014/0046837 A1* | 2/2014 | Metral .................. G06Q 40/02 |
| | | 705/41 |
| 2014/0052636 A1* | 2/2014 | Mattes ................ G06Q 20/409 |
| | | 705/44 |
| 2014/0188701 A1 | 7/2014 | Sreedhararaj et al. |
| 2014/0241609 A1 | 8/2014 | Vigue et al. |
| 2015/0012435 A1 | 1/2015 | Ramavarjula et al. |

OTHER PUBLICATIONS

"Viisage Acquires New Biometric Technology for Fraud Prevention and e-commerce Applications", PR Newswire, Nov. 30, 1999: 1528.

* cited by examiner

BANK ACCOUNT NUMBER VALIDATION

CROSS-REFERENCES TO RELATED APPLICATIONS

The present application a continuation of U.S. application Ser. No. 14/322,653, filed Jun. 2, 2014, entitled "BANK ACCOUNT NUMBER VALIDATION," which is a non-provisional application of and claims priority to U.S. Provisional Application No. 61/843,760, filed on Jul. 8, 2013, entitled "BANK ACCOUNT NUMBER VALIDATION," the entire contents of which are herein incorporated by reference for all purposes.

FIELD

The present disclosure generally relates to online commerce, and more particularly to validating payment information provided for online payments.

BACKGROUND

In online commerce, there is a need for tools for validating payment information. Consumers frequently make errors when entering payment information, and thereby provide invalid payment information to merchants for transactions. When a merchant submits invalid payment information, the payment information and transaction can be rejected. Rejected transactions can be costly for merchants and inconvenient for consumers.

Merchants can access a consumer's account and conduct a pre-authorization process to validate payment information and prevent rejected transactions. However, this process takes time and it may be inconvenient for both consumer and merchant. Further, a communication channel between a consumer and a merchant, or between a merchant and a merchant service provider, may corrupt data. Thus, even if a consumer correctly entered payment information, the merchant and/or merchant service provider may still receive invalid payment information, resulting in a rejected transaction.

Therefore, it is desirable to provide techniques for addressing these problems.

BRIEF SUMMARY

Embodiments of the present invention provide systems, methods, and apparatuses for validating payment information. For example, a first representation and a second representation of payment information can be received for a purchase via different channels. The first representation and second representation of the payment information can be compared in order to determine if the first representation and the second representation of the payment information match. If there is a match (e.g. they are identical or nearly identical), the payment information can be considered validated and the transaction can be approved.

In one embodiment, if the first representation and second representation of the payment information do not match, fraud analysis of the payment information can be triggered. Also, the payment information can be corrected. For example, the second representation of the payment information can be used to correct the first representation of the payment information, or a stored representation of the payment information can be used to correct the first representation of the payment information.

The payment information can be associated with a value token (e.g. a check, coupon, gift card, or credit card). In various embodiments, the first representation of the payment information can be received in a first form (e.g. manually entered text) and the second representation of the payment information can be received in a second form (e.g. an image of the value token). A received image of the value token can be analyzed (e.g. via optical character recognition (OCR)) to extract data and thereby determine the second representation of the payment information.

In one embodiment, the first representation and the second representation of the payment information can be received and validated by an MSP (merchant service provider) on behalf of a merchant. Alternatively, the first representation and the second representation of the payment information can be received and validated by a merchant directly. The first representation of the payment information can be received via a first communication channel, and the second representation of the payment information can be received via a second communication channel. An indicator may be included with both copies, and the indicator may be used to identify and correlate the first representation and the second representation of the payment information for comparison.

In some embodiments, a consumer can provide the first representation of the payment information to a checkout webpage (e.g. a hosted order webpage or a merchant-provided checkout webpage) by typing the payment information. For example, the consumer can enter a routing number and account number from a check. The webpage can provide an option for validating the payment information. The consumer can select the validate option, and the webpage may provide information to the consumer for submitting an image of the value token (e.g. the check).

In one embodiment, the consumer can provide the first representation of the payment information via a first consumer device (e.g. a desktop computer) and the second representation of the payment information via a second consumer device (e.g. a mobile device). Alternatively, the consumer can provide both the first representation and the second representation of the payment information via one consumer device.

Other embodiments are directed to systems and computer readable media associated with methods described herein.

A better understanding of the nature and advantages of embodiments of the present invention may be gained with reference to the following detailed description and the accompanying drawings.

DEFINITIONS

Figure 1:
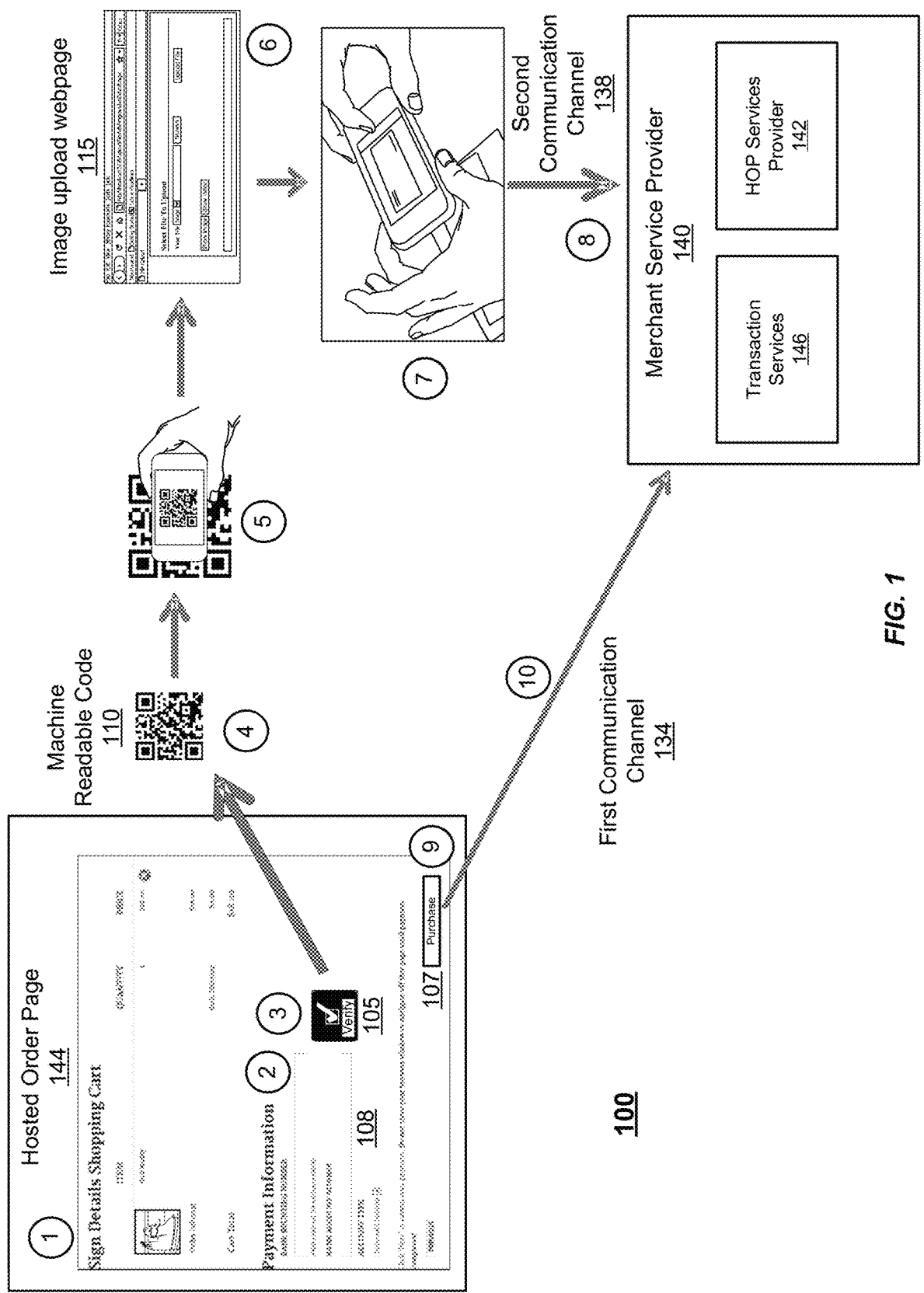
FIG. 1 shows a block diagram with an example flow 100 for delivering payment information to a merchant service provider.

A "value token" may be a token associated with a value. The token may be a software object, a hardware object, or a physical object. As examples of physical objects, the token may comprise a substrate such as a paper or plastic card, and information that is printed, embossed, encoded, or otherwise included at or near a surface of an object. A hardware object can relate to circuitry (e.g., permanent voltage values), and a software objet can relate to non-permanent data stored on a device. A value token may be associated with a value such as a monetary value, a discount, or store credit, and a value token may be associated with an entity such as a bank, a merchant, a payment processing network, or a person. A value token may be used as payment during a transaction. A value token may be a check, a credit card, a debit card, a prepaid card, a coupon, a discount code, a gift card, a gift certificate, or any other suitable form of payment. Various types of "payment information" can be included on a value token, such as a PAN (primary account number), a merchant identifier, a unique identifier, a date, a bank identifier, a name, an address, a security code, an expiration date, or any other suitable information. Information included on a value token may be represent a value associated with the value token, and may be provided as payment information for a payment.

As used herein, a "communications channel" may refer to any suitable path for communication between two or more entities. Suitable communications channels may be present directly between two entities such as a payment processing network and a merchant or issuer computer (i.e., not including Internet routers), or may include a number of different entities as intermediaries between the two entities. Any suitable communications protocol may be used for generating a communications channel, such as using messages (e.g., SMS or MMS) or a persistent connection. A communication channel involving the internet may be characterized by internet sockets, such that the use of a different internet socket can define a different communication channel. An internet socket may be identified by a port or address, such that different internet sockets have different ports and/or addresses. Accordingly, a communication channel may be partially or completely characterized by a computer server (e.g. a server hosting a website). A communication channel involving an MMS messaging service may be characterized by one or more nodes within a telecommunications network and/or a destination address (e.g. device identified by a telephone number). A communication channel may in some instance comprise a "secure communication channel," which may be established in any suitable manner, e.g., via the use of mutual authentication and a session key and establishment of an SSL session. By establishing a secure channel, sensitive information related to a payment device (such as account number, CVV values, expiration dates, etc.) may be securely transmitted between the two entities to facilitate a transaction.

As used herein, a "mobile device" may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). A mobile device may also comprise a verification token in the form of, for instance, a secured hardware or software component within the mobile device and/or one or more external components that may be coupled to the mobile device. A detailed description of an exemplary mobile device is provided below.

As used herein, "transaction information" may refer to any information corresponding to or describing purchases, orders, invoices, payments involving goods, services, and/or the like, and may include, but is not limited to, a purchase amount, a merchant identifier, description code (e.g., NAICS: North American Industry Classification System) associated with purchased items, cost of purchased items, and transactions as well as descriptions of purchased items, purchase dates, purchase amounts, indications of payments accounts used, indications of whether purchases were made online, confirmation numbers, order numbers, cancellation numbers, shipment status updates (e.g., order being processed, shipped, delivered, on back order, etc.), delivery tracking numbers, cancellation notices, updates, and/or the like. As used herein, an "item" may refer to a good, a service, or anything else that can be obtained in a transaction.

As used herein, a "risk score" may include an arbitrary designation or ranking that represents the risk associated that a transaction may be fraudulent. The risk score may be represented by a number (and any scale), a probability, or in any other relevant manner of conveying such information. The risk score may comprise an aggregation of information about a transaction, including transaction information, account information, and verification information as defined above. The risk score may be used by any authorizing entity (such as a merchant or an issuer) in determining whether to approve a transaction. The risk score may comprise and/or utilize both current transaction information and past transaction information, and may weight such information in any suitable manner.

As used herein, "short range communication" or "short range wireless communication" may comprise any method of providing short-range contact or contactless communications capability, such as RFID, Bluetooth™, infra-red, or other data transfer capability that can be used to exchange data between a payment device and an access device. In some embodiments, short range communications may be in conformance with a standardized protocol or data transfer mechanism (e.g., ISO 14443/NFC). Short range communication typically comprises communications at a range of less than 2 meters. In some embodiments, it may be preferable to limit the range of short range communications (e.g. to a range of less than 1 meter, less than 10 centimeters, or less than 2.54 centimeters) for security, technical, and/or practical considerations. For instance, it may not be desirable for a POS terminal to communicate with every payment device that is within a 2 meter radius because each of those payment devices may not be involved in a transaction, or such communication may interfere with a current transaction involving different financial transaction devices. Typically the payment device or the access device also includes a protocol for determining resolution of collisions (i.e. when two payment devices are communicating with the access device simultaneously). The use of short range communications may be used when the merchant and the consumer are in close geographic proximity, such as when the consumer is at the merchant's place of business.

An "authorization request message" may be an electronic message that is sent to a payment processing network and/or an issuer of a payment card or other value token to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

DETAILED DESCRIPTION

Consumers can provide payment information for online transactions. However, transactions can be returned or rejected if the payment information is incorrect or invalid. Consumers frequently make mistakes when entering payment information, and thereby provide invalid payment information to merchants. Rejected transactions can cause inconvenience for both consumers and merchants, and can be costly for merchants.

Merchants can prevent rejected transactions by conducting a pre-authorization process to validate payment information. However, this process can take too much time and may be inconvenient for both consumer and merchant. Accordingly, there is a need for validating payment information in a fast and cost-efficient manner.

Accordingly, embodiments can provide techniques for validating payment information. Embodiments can receive a first representation and a second representation of payment information, and can determine whether or not the first representation and the second representation of the payment information match. A match can indicate that the payment information was entered correctly and can result in validation of the payment information and approval of the transaction. The first representation and the second representation of the payment information can be received via two different communication channels, such that if one channel is corrupted, correct payment information can still be received via the other channel. When received via two different channels, the first representation and second representation of the payment information can be correlated and identified for comparison by identifying an indicator associated with both copies of the payment information. Validation can be performed by an MSP (merchant service provider) on behalf of a merchant, or by the merchant directly.

In some embodiments, the payment information can be associated with a value token (e.g. a check, coupon, gift card, or credit card). The first representation of the payment information can be received in a first form (e.g. manually entered text) and the second representation of the payment information can be received in a second form (e.g. an image of the value token). A received image of the value token can be analyzed (e.g. via optical character recognition (OCR)) to extract text from the image and thereby determine the second representation of the payment information.

In some embodiments, if the first representation and second representation of the payment information do not match, fraud analysis of the payment information can be triggered. Also, the payment information can be corrected. For example, the second representation of the payment information can be used to correct the first representation of the payment information, or a stored representation of the payment information can be used to correct the first representation of the payment information.

In some embodiments, the consumer can interact with a checkout webpage displayed on a first consumer device (e.g. a desktop computer). The consumer can provide the first representation of the payment information (e.g. by typing a routing number and account number) to the webpage and then select a validation icon. The webpage may then provide information to the consumer about how to submit an image of the value token (e.g. a check) associated with the payment information. The consumer can then provide an image of the value token via the first consumer device or via a second consumer device (e.g. a mobile device).

I. MSPS/HOPS

As online e-commerce grows, there is a need for a fast and cost-effective method of validating payment information. Pre-authorization can take too long, and there is no existing authorization network for some payment forms (e.g. checks, coupons, gift cards, etc.). For example, consumers can use checks to pay during online transactions by entering the check information (e.g. name, address, routing number, and account number). The check information is often accepted and submitted for settlement at a later time, and may not be validated or authorized before releasing goods. As a result, incorrect check information can be accepted, leading to rejected transactions. Accordingly, there is a need for validating payment information, such as check information, at a merchant or merchant service provider before forwarding the payment information to a clearinghouse or issuer for a transaction.

E-commerce often involves sensitive information, such as payment information. Merchants that handle consumer payment information may need to use resources to keep the payment information secure. For example, merchants that store payment information may have PCI compliant systems. Some merchants may not want to handle payment information so that they do not need to maintain PCI compliance.

MSPs (merchant service providers) can provide one or more services to merchants. For example, MSPs can assist in processing transactions. An MSP may be able to handle consumer payment information on behalf of a merchant so that the merchant never receives or stores consumer payment information. An MSP may provide an HOP (hosted order page) and/or an API (application programming interface) that facilitates checkout and receives payment information from the consumer. A merchant shopping webpage may redirect to an HOP or API when the consumer is ready to pay for selected goods and/or services. The consumer may enter payment information at the HOP or API, and the MSP may then receive the payment information use it to process the transaction on behalf of the merchant. When the transaction is authorized, the MSP may inform the merchant that the purchased items can be released, and the MSP may inform the consumer (e.g. via the HOP or API) that the purchase was successful. Further details regarding an MSP and an HOP that can be incorporated into the below-described system can be found in U.S. patent application Ser. No. 13/549,187 to Anderson and Ser. No. 13/559,250 to McCullagh. The applications are both hereby incorporated by reference in their entirety for all purposes.

II. Validating Payment Info

In embodiments, an MSP or a merchant server can receive two copies of a set of payment information for a transaction. The two copies of the payment information can be compared in order to determine if they match. A match can indicate that the consumer entered the payment information correctly, and the payment information may be considered validated. The MSP or merchant server may then submit the payment information for the transaction.

In embodiments, one representation of the payment information may be manually entered by the consumer or otherwise received as text. The other representation of the payment information may be received as an image of a value token associated with the payment information. The payment information may be visible on the value token. The MSP or merchant server may analyze the image and identify the payment information within the image (e.g. via optical character recognition (OCR)). Thus, if the consumer made a mistake when manually entering the payment information, the mistake can be identified when the manually entered payment information is compared against the payment information extracted from the image of the value token.

In embodiments, when a first set of payment information that was manually entered and a second set payment information that was extracted from an image of a value token do not match, the first representation of the payment information can be considered incorrect. In this case, the first representation of the payment information can be repaired by replacing any non-matching characters in the first representation of the payment information with corresponding characters in the second representation of the payment information. Alternatively, the second representation of the payment information may be submitted for the payment instead of the first representation of the payment information. Other methods, described herein, can also be used to repair the first representation of the payment information.

Validating payment information at a merchant or an MSP is advantageous as it can prevent a transaction from being rejected. For example, if payment information is determined to be invalid, the consumer can be notified and the payment information can be replaced or repaired before submitting the payment information for the transaction. Validating payment information at a merchant or MSP can be cheaper and more efficient than authenticating or authorizing the payment information at a payment processing network or issuer. Also, there may be insufficient payment processing network infrastructure to authenticate or authorize certain types of payment information, such as check information. Accordingly, validating check information may provide a new way for merchants to have assurance that the check information was entered correctly. Embodiments apply equally to other forms of payment information and value tokens, such as coupons, gift cards, prepaid cards, discount codes, gift certificates, credit cards, or any other suitable form of payment.

III. Sending/Receiving Via Two Channels

A. Communication Channels

An MSP may receive information from a consumer via one or more communication channels. A communication channel that involves the internet may be characterized by internet socket, such that the use of a different internet socket can define a different communication channel. An internet socket may be identified by a port or address, such that different internet sockets have different ports or addresses. A consumer device may send information to an HOP via an internet communication channel, and the HOP may then forward the information to the MSP. Other communication channels may utilize a telecommunications network for sending MMS messages. A consumer device may use an MMS message to send information directly to the MSP via a telecommunications network.

In embodiments, an MSP or merchant server may receive a first representation of payment information via a first communication channel and a second representation of payment information via a second communication channel. Thus, if one of the communication channels is damaged and corrupting data, or is otherwise compromised, the other communication channel may still be able to provide valid payment information to the MSP or merchant server.

B. Communication Via Multiple Consumer Devices

A consumer may use one or more consumer devices (e.g. desktop computer, laptop computer, mobile device, tablet, etc.) for online shopping and providing payment information. For example, a consumer may select items for purchase when online shopping via a desktop computer. The consumer may provide a first representation of payment information to an HOP webpage displayed on the desktop. The consumer may then use a mobile device to capture an image of a value token associated with the payment information. The mobile device may send the image to the desktop that can then provide the image to the HOP webpage, or the mobile device may send the image to an MSP or merchant server via a different communication channel. Allowing the consumer to use multiple consumer devices can make payment validation easier and more convenient for the consumer. Alternatively, the consumer can provide both copies of the payment information via one consumer device.

C. Example of Delivering Information

FIG. 1 shows a block diagram with an example flow 100 for delivering payment information to an MSP 140. In this example, two consumer devices are used to provide payment information, and two communication channels are used to send the payment information to the MSP 140.

A merchant server may provide a merchant shopping website where consumers can select and purchase goods and/or services from the merchant. A consumer may access the merchant website via a first consumer device. The consumer may add one or more goods and/or services to an electronic shopping cart, and may press a "go to cart" button. If the consumer intends to purchase the items presented on a shopping cart page, the consumer may select a "checkout" option provided on the merchant website. In response to the consumer selecting a checkout option, the merchant server may instruct the consumer device to redirect to an HOP 144 provided by MSP 140.

At bubble 1, the first consumer device may be redirected to HOP 144 provided by MSP 140. The merchant server may send information about the transaction, such as item identifiers, a total price, a transaction identifier, and any other suitable information to HOP 144. The merchant server may send the transaction information directly to HOP 144, or it may send the transaction information to the first consumer device and instruct the first consumer device to forward the transaction information to HOP 144. HOP 144 may display transaction information (e.g. the total transaction amount) on the first consumer device, and HOP 144 may include one or more payment input fields 108. HOP 144 may also display a selectable verification icon 105. HOP 144 may be included a first communication channel 134.

At bubble 2, the consumer may use the first consumer device to provide payment information to the HOP 144. For example, the consumer may manually type payment information such as an account number, a routing number, a name, a document number, and/or an address into payment input fields 108. The information entered by the consumer can be considered first information that represents the payment information. The payment information may be associated with value token 104 (e.g. a check). The consumer may also indicate what type of payment account (e.g. checking, savings) is being used. For example, the consumer may select an option from a drop-down menu. HOP 144 may be able to provide the payment information to MSP 140 (bubble 10). The connection between HOP 144 and MSP 140 may be considered first communication channel 134. First communication channel 134 may also include the connection between the first consumer device and HOP 144.

At bubble 3, the consumer may select (e.g. by clicking or tapping) verification icon 105. This may initiate a process for validating the payment information. In other embodiments, the validation process may automatically initiate after the consumer has entered payment information (at bubble 2). In other embodiments, the validation process may initiate after the consumer selects purchase icon 107 (at bubble 9).

At bubble 4, HOP 144 may provide machine-readable code 110 (e.g. QR code), which may be displayed on the first consumer device. Machine-readable code 110 may include information about communicating with MSP 140 via a second communication channel 138. For example, machine-readable code 110 may include a URL, an email address, a phone number, or any other suitable contact information for MSP 140. Machine-readable code 110 may also include information instructing a consumer device to access a webpage represented by the URL, to compose an MMS message to the phone number or email address, or to otherwise contact MSP 140. Machine-readable code 110 may be uniquely associated with the transaction and shopping session, and may contain a unique transaction identifier. HOP 144 may prompt the consumer to scan the displayed machine-readable code 110.

At bubble 5, the consumer may use a second consumer device to read the displayed machine-readable code 110, e.g., by taking a picture of the screen or otherwise receiving a message from the first consumer device. The second consumer device may decode the machine-readable code 110 (e.g., decode a QR code) and thereby receive the information about second communication channel 138, as well as any additionally included information (e.g. instructions to follow a URL or otherwise activate the communication channel). In other embodiments, the second consumer device may receive the information about second communication channel 138 in another manner. For example, HOP 144 may instruct the first consumer device to send the information about second communication channel 138 to the second consumer device via short-range communication. Alternatively, HOP 144 may display the information about second communication channel 138 so that the consumer can read it, and the consumer may manually enter the information into the second consumer device.

At bubble 6, the second consumer device may open an MSP-associated image upload webpage 115 in a web browser (via a URL received in machine readable code 110), compose an MMS message (addressed to an email address or telephone number received in machine readable code 110), or otherwise initiate second communication channel 138. Image upload webpage 115, as shown in FIG. 1, may be provided by MSP 140 or by a third party server. Image upload webpage 115 may prompt the consumer to capture an image of value token 104 (e.g., a check) and to upload it to image upload webpage 115. The image can correspond to second information. Image upload webpage 115 can be activated by a scanning program that has interpreted machine readable code 110.

At bubble 7, the consumer may use the second consumer device to capture an image of value token 104. The image may automatically be uploaded to image upload webpage 115, or the consumer may manually select the image for uploading. In another embodiment, the second consumer device can communicate (e.g., wirelessly) with the value token to obtain the second information.

At bubble 8, the second information (e.g., including the image) of value token 104 may be sent to MSP 140 via second communication channel 138. Image upload webpage 115 may then inform the consumer that the image was successfully sent, and the second consumer device may then close the window. The second information sent via second communication channel 138 can include a transaction identifier that was received as part of machine readable code 110.

At bubble 9, the consumer may select purchase icon 107 displayed by HOP 144 on the first consumer device.

At bubble 10, HOP 144 may transmit the payment information to MSP 140 via first communication channel 134. A transaction identifier can also be transmitted and used to correlate the payment information with the second information obtained from the second consumer device. MSP 140 may then proceed to validate the payment information, as described in detail below. HOP 144 may later inform the consumer when the payment information is validated and the transaction is authorized. HOP 144 may then close and the first consumer device may be redirected back to the merchant website. If the payment information is not validated or authorized, HOP 144 may prompt the consumer for a new set of payment information.

D. Example System

Figure 2:
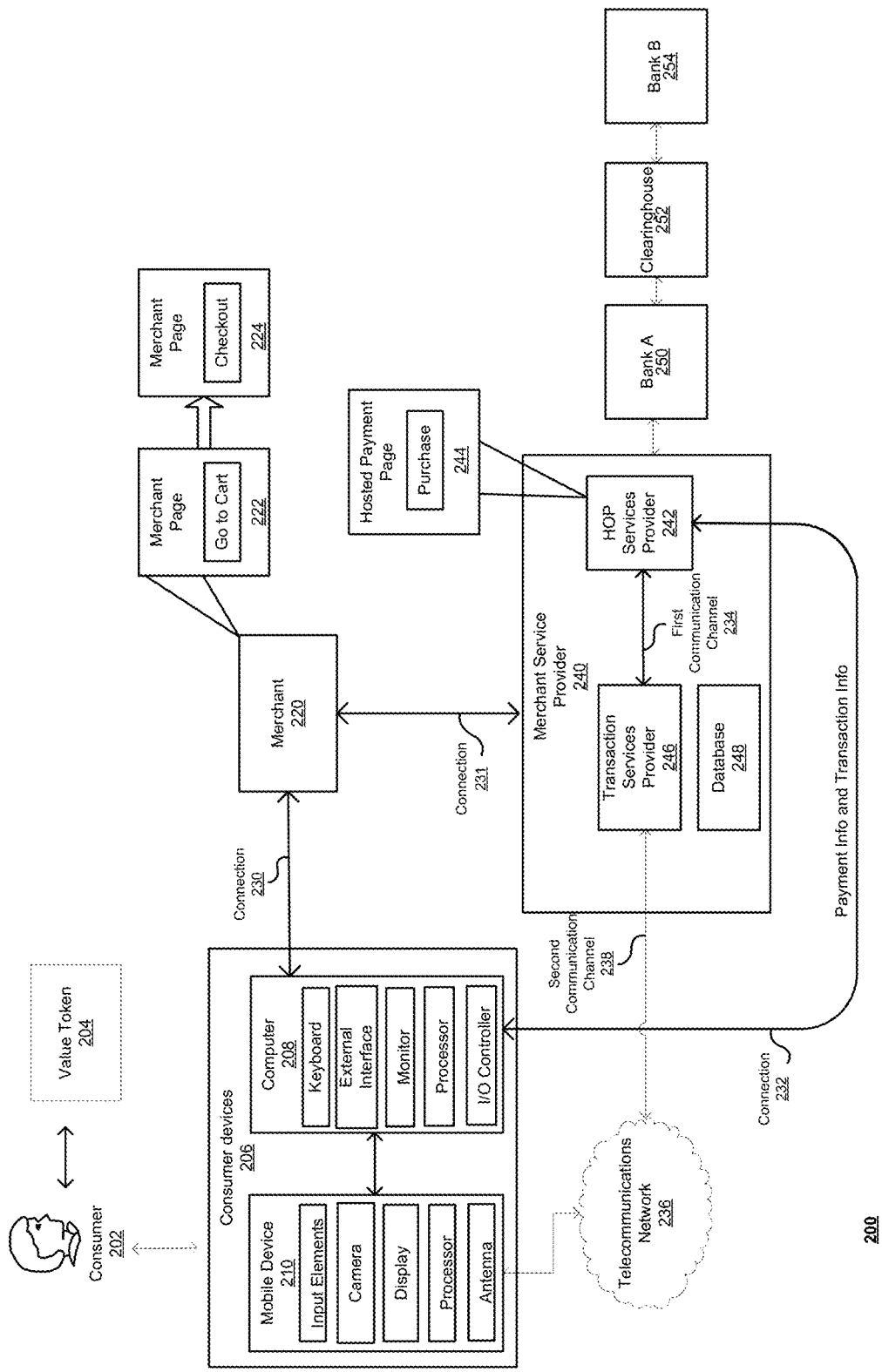
FIG. 2 shows system 200 for validating payment information.

FIG. 2 shows system 200 for validating payment information. FIG. 2 depicts consumer 202, value token 204 associated with consumer 202, and consumer devices 206 associated with consumer 202, including computer 208 and mobile device 210. FIG. 2 also depicts merchant 220 and merchant webpages 222 and 224 which may be associated with a merchant website. An MSP 240 is shown that includes database 248, transaction services provider 246, and HOP services provider 242 with an associated hosted payment page (or HOP) 244. Providers 242 and 246 can be separate applications running on a same server or different servers. FIG. 2 further includes telecommunications network 236, first communication channel 234, second communication channel 238, Bank A 250, clearinghouse 252, and Bank B 256. One or more communication channels may exist between one or more of the entities shown in FIG. 2. For example, consumer devices 206 may be in communication with merchant 220 and MSP 240. Computer 208 may communicate with MSP 240 via first communication channel 234, which may also include connection 232. Mobile device 210 may communicate with MSP 240 via second communication channel 238, which may include telecommunications network 236.

Merchant 220 may be in direct communication with MSP 240 via connection 231, or merchant 220 may communicate with MSP 240 via consumer devices 206 (e.g. via connection 230 and connection 232). Each of connection 230, connection 231, connection 232, first communication channel 234, and second communication channel 238 may comprise a unique communication channel. A unique communication channel may comprise, for example, a unique internet socket (with unique ports or addresses), a unique sequence of internet sockets, a unique sequence of nodes in a telecommunications network, or any other suitable communication pathway.

System 200 illustrated in FIG. 2 can be referred to as a hosted service system, wherein MSP 240, acting as a "host", hosts services for clients, such as merchant 220. According to the illustrated embodiment, merchant 220 and consumer 202 can transmit information associated with electronic transactions to MSP 240. According to some embodiments, merchant 220 may transmit information, such as transaction information, to MSP 240, which performs one or more services based at least on the transaction information received from merchant 220.

FIG. 2 depicts two consumer devices 206 (e.g., mobile device 210 and computer 208), but consumer 202 can have any number of consumer devices 206. A consumer device 206 may be a desktop computer, a laptop computer, a mobile device, a tablet, or any other suitable device. Consumer 202 may use one or more consumer devices 206 for online shopping, capturing images, and providing payment information.

Mobile device 210 can include a number of components. Consumer 202 may use mobile device 210 for online shopping at merchant 220, providing payment information to HOP 244, communicating with MSP 240 via first communication channel 234 and/or second communication channel 238, capturing an image a value token 204, or for any other suitable purpose.

Computer 208 can include a number of components, such as a keyboard, an external interface, a monitor, a processor, and an I/O controller. Consumer 202 may use computer 208 for online shopping at merchant 220, for providing payment information to HOP 244, for communicating with MSP 240 via first communication channel 234 and/or second communication channel 238, for capturing an image of value token 204, or for any other suitable purpose.

Merchant 220 may be associated with a merchant website that may include merchant webpages 222 and 224. The merchant website may be provided by a server, such as a merchant server or by a third-party server. The merchant website may allow consumer 202 to browse and select items for purchase via a consumer device 206 (e.g., mobile device 204 or computer 208). When consumer 202 selects a "checkout" button on merchant page 224, the website may redirect consumer device 206 to HOP 244. The merchant website may store information about redirecting to HOP 244, such as a URL associated with HOP 244. In some embodiments, merchant 220 may be able to provide information about the transaction and/or consumer 202 to HOP 244 or MSP 240. Merchant 220 may provide information directly to MSP 240 via connection 231, or merchant 220 may provide information to consumer device 206 and instruct consumer device 206 to send the information to HOP 244 via connection 232.

In some embodiments, merchant 220 may not receive or store consumer 202 information. In other embodiments, merchant 220 may receive and store consumer 202 information, and may maintain a consumer 202 account. In some embodiments, merchant 220 may validate payment information and directly perform activities that could otherwise be performed by MSP 240.

MSP 240 can provide one or more services to merchant 220. For example, MSP 240 can assist in processing transactions. MSP 240 may be able to handle consumer 202 payment information on behalf of merchant 220 so that merchant 220 never receives or stores consumer 202 payment information. Various MSP 240 functions can be handled by HOP Services Provider 242, Transaction Services Provider 246, database 248, and/or any other suitable module. In some embodiments, MSP 240 may be included in clearinghouse 252. Further details regarding an exemplary MSP can be found in FIG. 6 as well as the description below Bank A 250 may be an acquirer associated with merchant 220. Bank A 250 may be able to receive payment information and transaction information from MSP 240. Bank A 250 may be able to send the payment information and transaction information to clearinghouse 252 for settlement purposes. Bank A 250 may also be able to send an authorization response message to clearinghouse 252 (or another payment processing network). Bank A 250 may be able to inform MSP 220 and/or merchant 220 of the settlement and/or authorization results.

Clearinghouse 252 may provide check clearing and other payment processing services. For example, clearinghouse 252 may be able to communicate with one or more financial institutions, and may be able to relay messages between financial institutions. Clearinghouse 252 be able to route payment information for settlement and/or authorization request messages between Bank A 250 and Bank B 254.

Bank B 254 may be an issuer. For example, Bank B 254 may issue a payment account (e.g. a checking account or savings account) and one or more associated value tokens (e.g. checks) to the consumer 202. In some embodiments, Bank B 254 may be able to receive payment information from clearinghouse 252, and may determine if the payment information is valid as well as if an associated payment account has sufficient funds for the transaction. Accordingly, Bank B 254 may be able to release funds for settlement and clearing, and also may be able to authorize transactions and send an authorization response message to clearinghouse 252.

IV. Method for Validating Information

Figure 3:
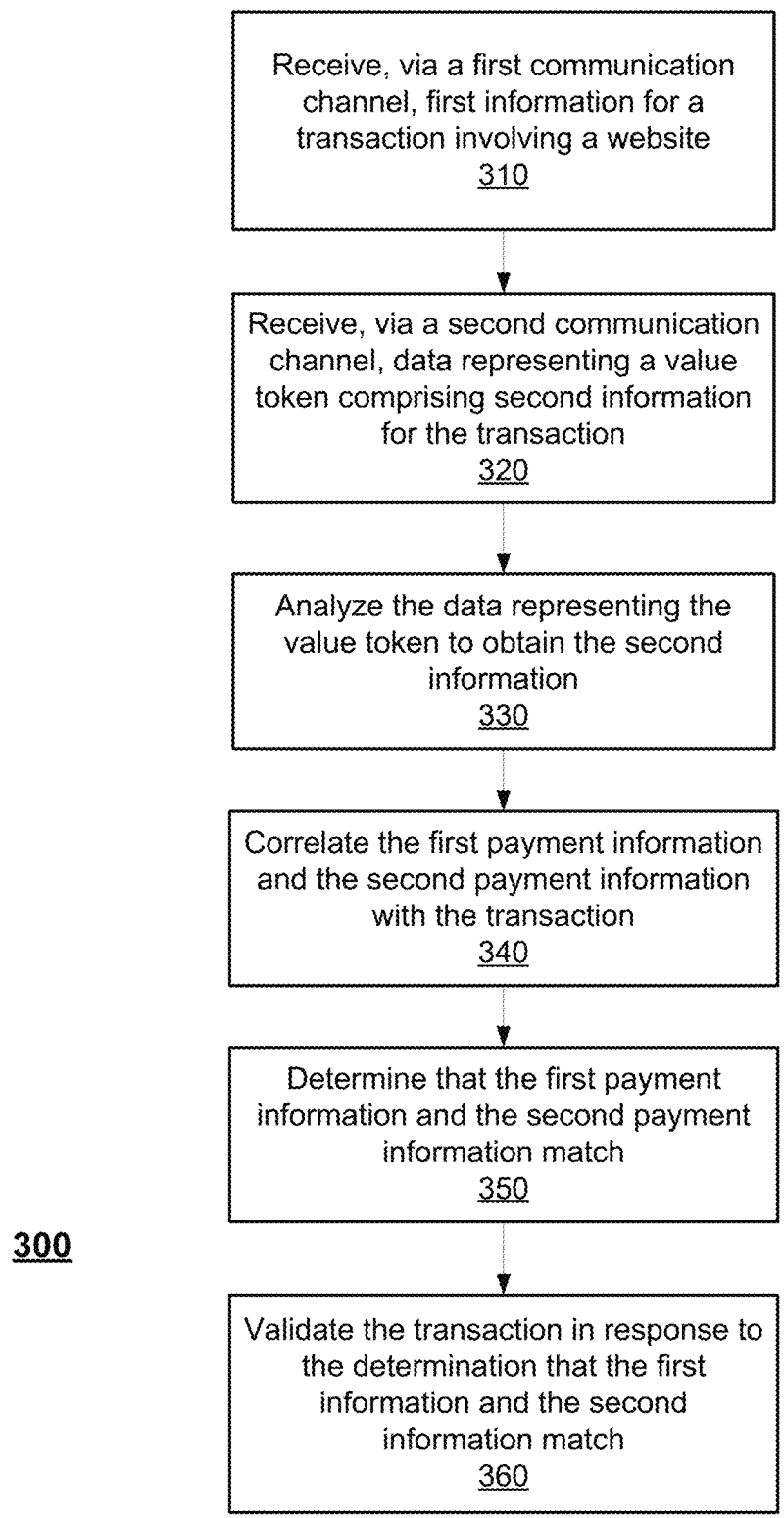
FIG. 3 shows an exemplary corresponding flow 300 for validating payment information.

As explained above, an MSP can handle payment information on behalf of a merchant, and can assist in processing a transaction. FIG. 1, as already discussed, shows an exemplary flow for delivering payment information to an MSP. FIG. 3 shows a flowchart of a method 300 from the perspective of the MSP for validating the payment information according to embodiments of the present invention.

At block 310, a primary server (e.g., MSP 240) can receive a first representation of payment information for an online transaction. A first representation of the payment information may be received via a first communication channel. In some embodiments, the first representation of the payment information may be received at a transaction services provider (e.g. transaction services provider 246) associated with the primary server. The first representation of the payment information may have been forwarded by an HOP services provider (e.g. HOP services provider 242), and may have been originally sent by a first consumer device (e.g. computer 208). Accordingly, the first representation of the payment information may be considered to be "received" from the HOP services provider and/or the first consumer device. As used herein, "received from" can be used when information was received directly from the sending entity, and can also be used when the information was relayed by another entity.

The first representation of the payment information may comprise one or more fields of text. The first representation of the payment information may include a merchant identifier, an account number, a routing number, a check number or other document number, a date, a bank identifier, a name, an address, a security code, an expiration date, or any other suitable information. A transaction identifier may be received together with the first representation of the payment information.

At block 320, the primary server (e.g. MSP 240 or transaction services provider 246) can receive data representing a value token (e.g. value token 204) for the same transaction. The same transaction identifier may also be received together with the data representing the value token. In some embodiments, the data representing the value token may be received via a second communication channel. In other embodiments, the second communication channel can be the same as the first communication channel. In embodiments, the data representing the value token may be received at the transaction services provider, and the data representing the value token may be received from a second consumer device (e.g. mobile device 210). The second consumer device can be the same as the first consumer device or it may be a different consumer device.

The data representing the value token may comprise an image. The image may include text or other forms of information, and the image may include a second representation of the payment information. Accordingly, receiving the receive data that represents the value token can also mean receiving a second representation of the payment information.

At block 330, the primary server may analyze the data representing the value token to obtain the second representation of the payment information. For example, if the data representing the value token comprises an image, the primary server may use OCR to determine any text included in the image and thereby determine the second representation of the payment information.

At block 340, the primary server may correlate the first representation of the payment information and the second representation of the payment information. In some embodiments, the first representation of the payment information and the second representation of the payment information may both be identified and correlated by an associated unique transaction identifier. In other embodiments, the correlation can use multiple pieces of data, such as merchant, transaction amount, consumer name, etc. Once the first representation of the payment information and the second representation of the payment information are identified and correlated, the primary server can proceed to compare the information and execute other operations, as shown below.

At block 350, the primary server can compare the first representation of the payment information and the second representation of the payment information in order to determine whether or not they match. For example, the primary server may compare each consecutive character of the first representation of the payment information and the second representation of the payment information. Various embodiments can use different matching criteria.

At block 360, the primary server may validate or may not validate the first representation of the payment information and/or the second representation of the payment information. Validation of the first representation of the payment information and/or the second representation of the payment information can be based on a number of parameters, such as whether the first representation of the payment information and the second representation of the payment information match each other, whether the first representation of the payment information and/or the second representation of the payment information match formatting standards, the results of a fraud analysis, etc.

A. Comparing Information

In some embodiments, if every character matches, it can be determined that the first representation of the payment information and the second representation of the payment information match, while if there is one or more mismatching characters, it can be determined that the first representation of the payment information and the second representation of the payment information do not match.

In other embodiments, the first representation of the payment information and the second representation of the payment information may be considered matching even if there is a predetermined amount of mismatched characters. For example, the first representation of the payment information and the second representation of the payment information may match if the number of mismatched characters is less than or equal to one, three, five, or any other suitable number. The primary server may compare some or all of the first representation of the payment information and the second representation of the payment information, such as routing numbers, account numbers, names, and addresses included in the first representation of the payment information and the second representation of the payment information.

In some embodiments, the first representation of the payment information and/or the second representation of the payment information may be compared against payment information formatting standards. For example, a routing number included in the first representation of the payment information may be compared against routing number format standards (e.g. an expected routing number format). Other portions of the first representation of the payment information, such as an account number, a name, an address, or any other suitable information can also be compared against formatting standards. Accordingly, the primary server may determine if the first representation of the payment information and/or the second representation of the payment information match formatting standards.

If the first representation of the payment information and the second representation of the payment information do not match, or if the first representation of the payment information and/or the second representation of the payment information do not match formatting standards, the primary server may perform one or more additional operations. For example, the primary server may conduct a fraud analysis on the first representation of the payment information and/or the second representation of the payment information. A plurality of fraud detection algorithms may be run to assess the risk associated with the transaction and to provide an approve/deny indication.

The primary server may also repair the first representation of the payment information and/or the second representation of the payment information. For example, the consumer's name in the first representation of the payment information may not match the consumer's name in the second representation of the payment information, but the routing numbers in the first representation of the payment information and the second representation of the payment information may match. The consumer's name may have been typed incorrectly, but the routing number may have been typed correctly. In embodiments, the primary server can provide the correct name for the transaction. In some embodiments, errors in the first representation of the payment information can be fixed based on the second representation of the payment information. The primary server may determine the correct name from the second representation of the payment information, and may replace the incorrect name in the first representation of the payment information with the name from the second representation of the payment information. Alternatively, the second representation of the payment information may be used for the transaction instead of the first representation of the payment information. If the second representation of the payment information was based on an image of the value token, the second representation of the payment information may be trusted as correct information.

In some embodiments, the primary server may store payment information (e.g. at database 248), and may use stored payment information to repair the first representation of the payment information. The primary server may be able to identify a stored set of payment information that is similar to the first representation of the payment information. For example, The primary server may conduct a sub-string analysis of the first representation of the payment information and one or more stored sets of payment information. If at least a certain portion of the characters of the first representation of the payment information are matched with a portion of the characters of a certain stored set of payment information, it can be determined that the stored set of payment information corresponds to the first representation of the payment information. For example, it can be determined that the stored set of payment information corresponds to the first representation of the payment information if at least 5, 10, or 15 characters match, or if at least 1, 3, or 5 fields match. The primary server can use the stored set of payment information to fix the inaccurate portions of the first representation of the payment information.

In some embodiments, a database (e.g. database 248) may be used to store payment information associated with a consumer. The database may contain an entry for each of the consumer's bank accounts, routing numbers, names, and other related information. The stored payment information may be retrieved when a transaction is taking place that involves a certain name, account number, routing number, consumer device, or consumer account. The first representation of the payment information may be compared against and/or repaired with the stored payment information. For example, if the primary server receives a 9-digit routing number that almost matches a 10-digit routing number that is stored in the database and associated with the consumer, the primary server can determine that the erroneous 9-digit routing number should be the 10-digit routing number. The primary server can replace the erroneous information with the correct 10-digit routing number. The database may also contain information about related payment accounts that may not directly belong to the consumer. For example, a husband and wife may have related accounts.

B. Post-Validation

In embodiments, if the first representation of the payment information and/or the second representation of the payment information match, the first representation of the payment information may be considered validated, and the primary server may proceed to process the transaction using the first representation of the payment information. If there are any issues with the first representation of the payment information (e.g. formatting errors, non-matching second representation of the payment information), the primary server may repair the first representation of the payment information, as already discussed, and then validate the repaired first representation of the payment information.

In embodiments, if the first representation of the payment information and/or the second representation of the payment information are not validated, the primary server may inform the consumer via a consumer device. The consumer may then be able to provide new payment information or re-enter the same payment information (e.g. in case there was a typo or an unclear image).

In embodiments, after validating the first representation of the payment information and/or the second representation of the payment information, the primary server may allow the transaction to proceed and submit the payment information for settlement and/or authorization. For example, if the payment information is check information or coupon information, the check information or coupon information may be directly submitted for settlement. If the payment information is credit card information, the credit card information may be submitted for authorization, and settlement may take places at a later time. In some embodiments, the second representation of the payment information may be primarily involved for validating the first representation of the payment information, and the primary server may use the validated first representation of the payment information for the transaction. The primary server may send the payment information and transaction information to an acquirer (e.g. Bank A 250) associated with the merchant. The acquirer may send the information to a clearinghouse (e.g. clearinghouse 252), which may in turn forward the information to an issuer (e.g. Bank B 254) associated with the payment information. The issuer may send funds in settlement/clearing messages to the primary server, or the issuer may authorize the transaction and return an authorization response message.

In embodiments, the primary server may inform the merchant and the consumer device whether or not the transaction was authorized. The primary server may use one or more of the first communication channel (e.g. first communication channel 234), the second communication channel (e.g. second communication channel 238), and any other suitable communication channel (e.g. connection 231) to inform the merchant and the consumer device. For example, the HOP (e.g. HOP 244) may inform the consumer that the transaction was successfully authorized. In some embodiments, the primary server may redirect the consumer device back to the merchant website, and the merchant website may inform the consumer that the transaction was successful. The merchant may provide the goods or services to the consumer after being informed that the payment information is valid and/or authorized (e.g. the check is valid).

V. Options for Devices, Channels, and Payment Information

A. One Device Vs. Two Devices

As described above, a consumer may operate one or more consumer devices. Although FIG. 2 shows two consumer devices 206, there may be only one consumer device 206, and it may be mobile device 210, computer 208, or any other suitable device.

There may be advantages in involving just one consumer device, and there may be other advantages in involving two consumer devices. For example, it may be more user-friendly if the consumer only uses a mobile device, as the consumer may not need to manage two different devices. Also, the consumer may not need to locate another usable device if the consumer does not have a second device. Alternatively, if the consumer prefers to shop online via a desktop or laptop, it may be more convenient to involve a mobile device as a second consumer device. Desktops may not have a camera component, or may only be able to capture images if an auxiliary camera module is used. Accordingly, being able to shop via desktop and then capture an image of a value token with a mobile device may be more convenient and enjoyable to the consumer.

B. One Channel Vs. Two Channels

In some situations, a communication channel can malfunction such that it corrupts data. If a communication channel leading to a primary server (e.g. MSP 240) is corrupted, payment information may be become altered and invalid when travelling to the primary server. Thus, even if a consumer correctly entered payment information, the primary server may receive invalid payment information and reject the transaction.

In embodiments, in order to avoid this problem, the first representation of the payment information and the second representation of the payment information are sent via two different communication channels. Thus, if one of the communication channels is damaged and corrupting data, or is otherwise compromised, the second communication channel may still be able to provide valid payment information to the primary server.

In other embodiments, one communication channel (the same channel) can be used to provide both the first representation of the payment information and the second representation of the payment information. For example, referring back to FIG. 1, the consumer 202 may upload an image of the value token 204 to the HOP 244. Thus, the manually entered first representation of the payment information and the second representation of the payment information (e.g. the image of the value token 204) can be sent together over the same communication channel.

C. HOP vs. Merchant Website

MSPs and HOPs, as described above, can assist in transaction processing, can perform payment information validation, can handle payment information so that merchants do not have to, and can perform a number of other functions. However, in some embodiments, a merchant may handle transaction processing without the help of an MSP or HOP. For example, the merchant may receive one or more copies of payment information from a consumer (via one or more communication channels), validate the payment information, and/or submit the payment information for processing. The merchant may have a website and databases that are PCI compliant, and the merchant may perform any MSP and HOP functions described herein. The merchant website may be hosted on a merchant server, or on a third party server with a different internet socket.

D. Typed Payment Information and Images

Payment information can be provided in various forms, including manually-entered payment information and images of value tokens containing payment information, as described above. An image of a value token (e.g. check) may include a consumer's name, address, zip code, phone number, a bank account number, a routing number, a coupon code, a CVV, a quick response (QR) code, and/or any other suitable information.

In some embodiments, manually-entered payment information can be validated by comparing with payment information extracted from an image of an associated value token. In other embodiments, a consumer may manually enter payment information twice, and the second entry may be used to validate the first entry. In other embodiments, two different images of the same value token can be provided, and payment information can be extracted from each. Payment information extracted from the second image can be used to validate payment information extracted from the first image.

In some embodiments, there may be an expected image format. For example, certain check issuers may use certain check formats. If a check image from a certain check issuer is received, the primary server may validate the check image if the check conforms to an expected check format. Payment information can be received in a number of other formats and validated in a number of other manners.

E. Alternative Example for Delivering Information

Figure 4:
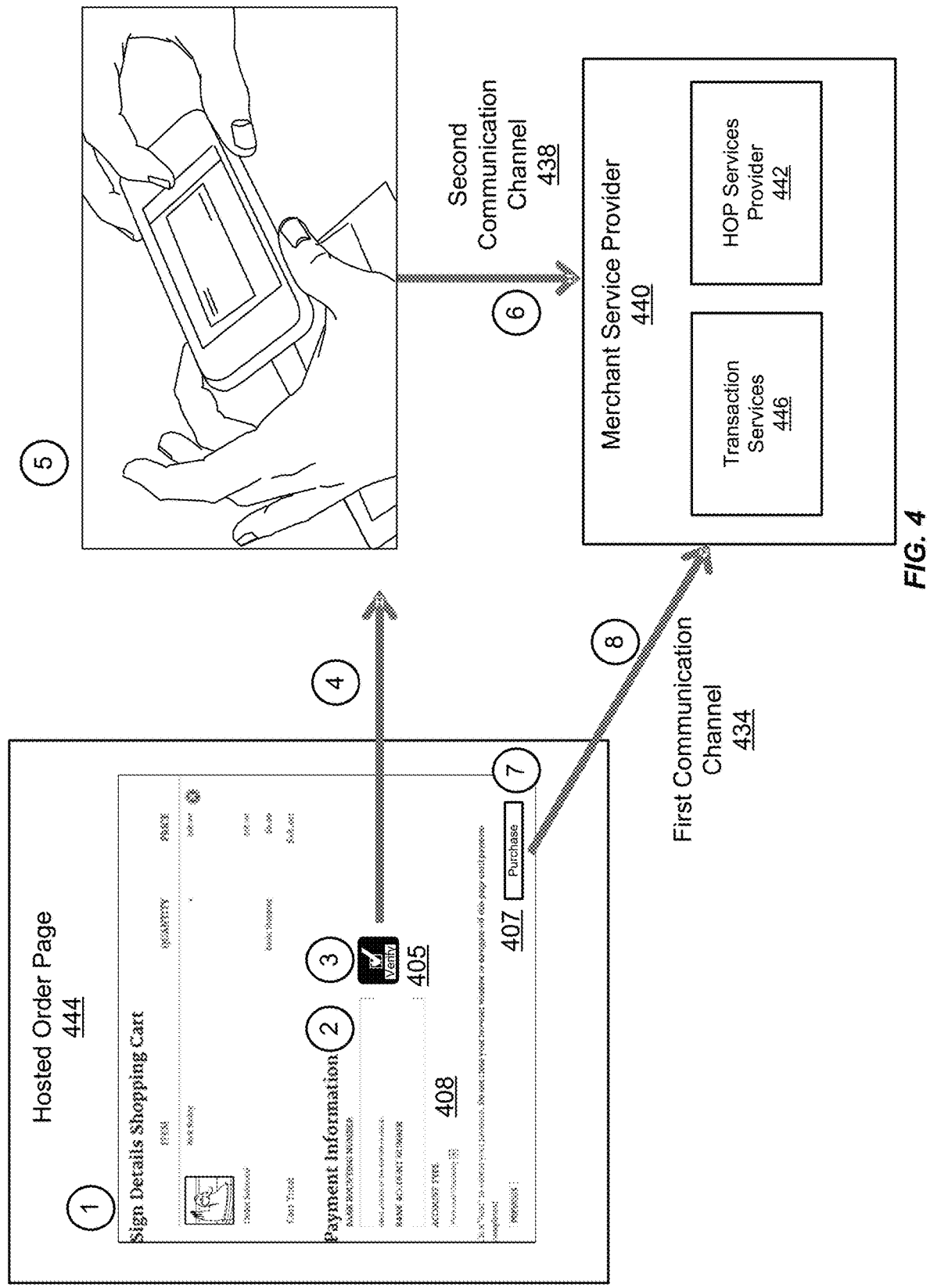
FIG. 4 shows a block diagram with another example flow 400 for delivering payment information to a merchant service provider.

FIG. 4 shows a block diagram with a second example flow 400 for delivering payment information to MSP 440. Some components shown in FIG. 4 can operate in a similar manner as components shown in FIG. 2. In this example, one consumer device is used to provide payment information, and two communication channels are used to send the payment information to MSP 440. Thus, the consumer device can be used to browse a merchant's website, select items, go to a hosted order page for sending first information for the transaction, and separately send second information for a value token via a separate channel.

A merchant server may provide a merchant shopping website where consumers can select and purchase goods and/or services from the merchant. A consumer may access the merchant website via a consumer device. The consumer may add one or more goods and/or services to an electronic shopping cart, and may press a "go to cart" button. If the consumer intends to purchase the items presented on a shopping cart page, the consumer may select a "checkout" option provided on the merchant website. In response to the consumer selecting a checkout option, the merchant server may instruct the consumer device to redirect to HOP 444 provided by MSP 440.

At bubble 1, the consumer device may redirect to HOP 444 provided by MSP 440. The merchant server may send information about the transaction, such as item identifiers, a total price, a transaction identifier, and any other suitable information to HOP 444. The merchant server may send the transaction information directly to HOP 444, or it may send the transaction information to the consumer device and instruct the consumer device to forward the transaction information to HOP 444. HOP 444 may display transaction information (e.g. the total transaction amount) on the consumer device, and HOP 444 may include one or more payment input fields 108. HOP 444 may also display selectable verification icon 105.

At bubble 2, the consumer may provide payment information to HOP 444. For example, the consumer may manually type payment information such as an account number, a routing number, a name, a document number, and/or an address into payment input fields 108. The payment information may be associated with a value token (e.g. a check). The consumer may also indicate what type of payment account (e.g. checking, savings) is being used. For example, the consumer may select an option from a drop-down menu. HOP 444 may be able to provide the payment information to MSP 440 (bubble 7). The connection between HOP 444 and MSP 440 may be considered first communication channel 434. First communication channel 434 may also include a connection between the consumer device and HOP 444.

At bubble 3, the consumer may select (e.g. by clicking or tapping) verification icon 105. This may initiate a process for validating the payment information. In other embodiments, the validation process may automatically initiate after the consumer has entered payment information (in bubble 2). In other embodiments, the validation process may initiate after the consumer selects purchase icon 107 (in bubble 9).

At bubble 4, HOP 444 may send instructions to the consumer device for opening a camera application. HOP 444 may instruct the consumer to capture an image of the value token. HOP 444 may also provide information about a second communication channel 438 for communicating with MSP 440. For example, HOP 444 may provide a URL, an email address, a phone number, or any other suitable MSP 440 contact information.

At bubble 5, the consumer may use the consumer device to capture an image of the value token. The consumer may confirm that a proper image was captured, or the camera application on the consumer device may confirm that the image is clear and sharp, for example.

At bubble 6, the consumer device may automatically send, based on instructions from HOP 444, the image of the value token to MSP 440 via second communication channel 438. For example, the consumer device may upload the image to an MSP-associated webpage, send an MMS message with the image to an MSP-associated MMS address, or otherwise provide the image to MSP 440. In some embodiments, MSP 440 may provide an API instead of HOP 444, and the API may be installed on the consumer device. The API may store information about sending images to MSP 440 (e.g. an MMS address), and may automatically send the image to MSP 440 via second communication channel 438. In some embodiments, the consumer device may instead provide the image to HOP 444.

The consumer device may then inform the consumer that the image was successfully sent. For example, HOP 444 may confirm that the image was received at MSP 440, or MSP 440 may otherwise send a confirmation message.

At bubble 7, the consumer may select purchase icon 107 displayed by HOP 444 on the consumer device.

At bubble 8, HOP 444 may transmit the payment information to MSP 440 via first communication channel 434. MSP 440 may then proceed to validate the payment information, as described herein. HOP 444 may later inform the consumer when the payment information is validated and the transaction is authorized. HOP 444 may then close and the consumer may be redirected back to the merchant website. If the payment information is not validated or authorized, HOP 444 may prompt the consumer for a new set of payment information.

VI. Use of Mobile Device

As described above, a consumer may operate one or more consumer devices (e.g. consumer devices 206). The consumer device may communicate with a merchant website, a primary server (e.g. an MSP), a checkout webpage (e.g. an HOP), or any other suitable entity. The consumer device may comprise a user interface, such that the consumer can receive information and provide information.

A. Method

Figure 5:
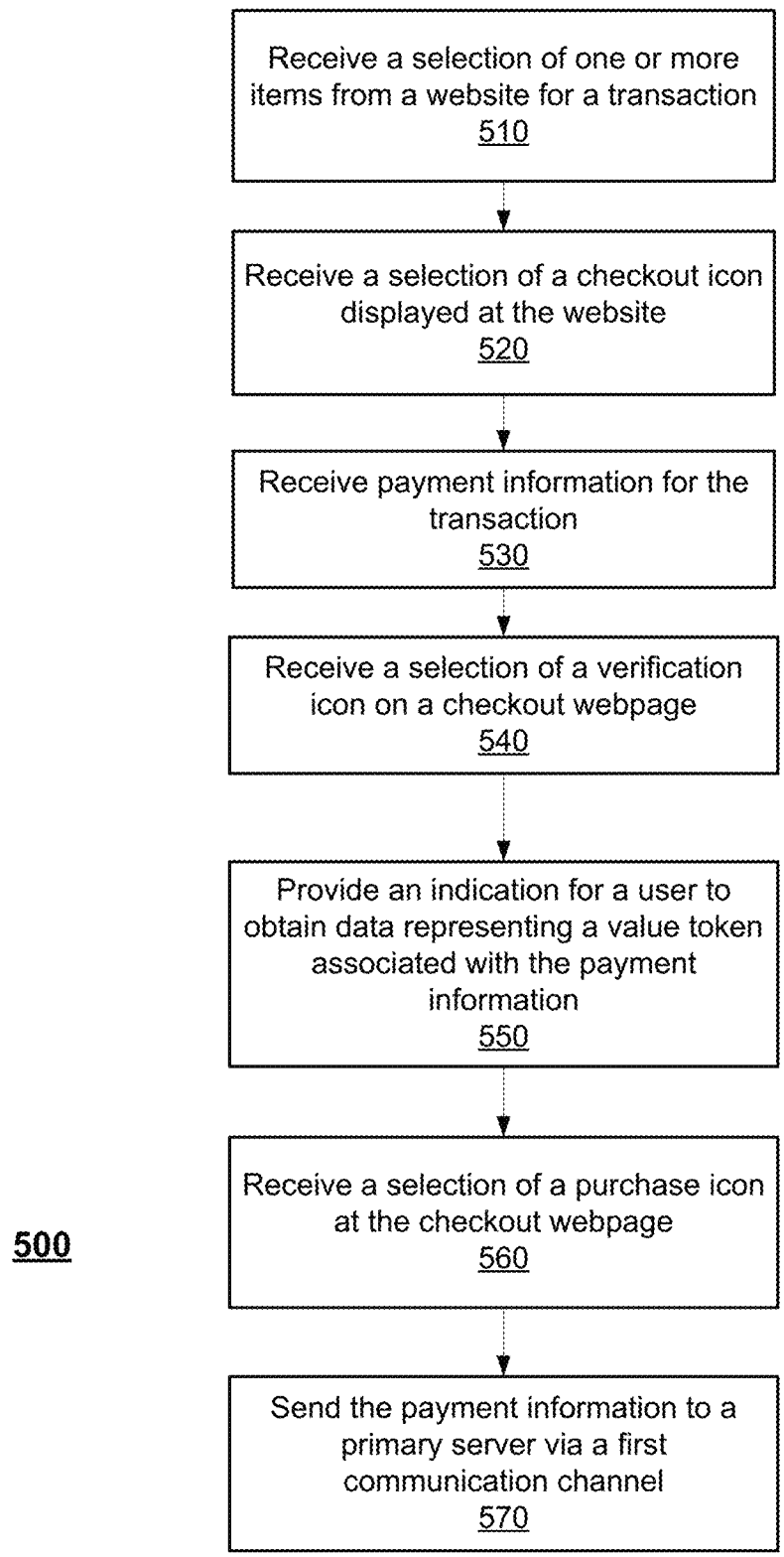
FIG. 5 shows an example flow for interacting with a hosted order page.

FIG. 5 shows an example flow for interacting with a hosted order page. At block 510, a first consumer device (e.g. consumer device 206) receives a selection of one or more items from a website for a transaction. For example, a consumer may be browsing a merchant website via the first consumer device.

At block 520, the first consumer device receives a selection of a checkout icon displayed at the website. The icon may be displayed so that the consumer can select (e.g. by clicking or tapping) the icon when finished and ready to purchase the selected items. The merchant website may then proceed to a checkout webpage. For example, the merchant website may instruct the first consumer device to redirect to an HOP (e.g. HOP 244). In some embodiments, the merchant website may instead initiate an API.

At block 530, the first consumer device receives payment information for the transaction, and the first consumer device may enter the payment information into payment fields displayed at the checkout webpage (e.g. at an HOP). In embodiments, the payment information may be manually entered by the consumer. Alternatively, the payment information may be stored at the first consumer device (e.g. at the secure element) or in an online consumer wallet, and the stored payment information may be automatically provided to the checkout webpage. The consumer may also select an account type from, for example, a drop down list at the checkout webpage. The checkout webpage may be able to send the payment information to an primary server (e.g. MSP 240) via a first communication channel.

At block 540, the first consumer device receives a selection of a verification icon displayed on the checkout page. The icon may be displayed so that the consumer can select (e.g. by clicking or tapping) the icon after entering payment information. The checkout webpage may then initiate a process for obtaining another representation of the payment information (e.g. an image of a value token). The checkout webpage may display additional instructions on the consumer device, or the consumer device may be redirected to a separate verification webpage.

At block 550, the first consumer device provides, via the checkout webpage, an indication for the consumer to obtain data representing a value token associated with the payment information. For example, the checkout webpage may display a message instructing the consumer to capture an image of the value token. The consumer may use the first consumer device to capture an image of the value token. The image may be uploaded to the checkout webpage, uploaded to a separate webpage associated with the primary server, or automatically sent (e.g. via MMS) to the primary server via a second communication channel.

In some embodiments, the checkout webpage may provide information for contacting the primary server to a second consumer device. For example, the checkout webpage may display a QR code including the contact information on the first consumer device, and the second consumer device may scan the QR code to retrieve the contact information. The consumer may use the second consumer device to capture an image of the value token, and the second consumer device may provide the image to the HOP or the primary server.

At block 560, the consumer device receives a selection of a purchase icon displayed at the checkout webpage. The icon may be displayed so that the consumer can select (e.g. by clicking or tapping) the icon when ready to submit payment information for the transaction.

At block 570, the consumer device sends the payment information to a primary server via the first communication channel. Examples of first communication channels are provided herein.

B. Mobile Device

Figure 6:
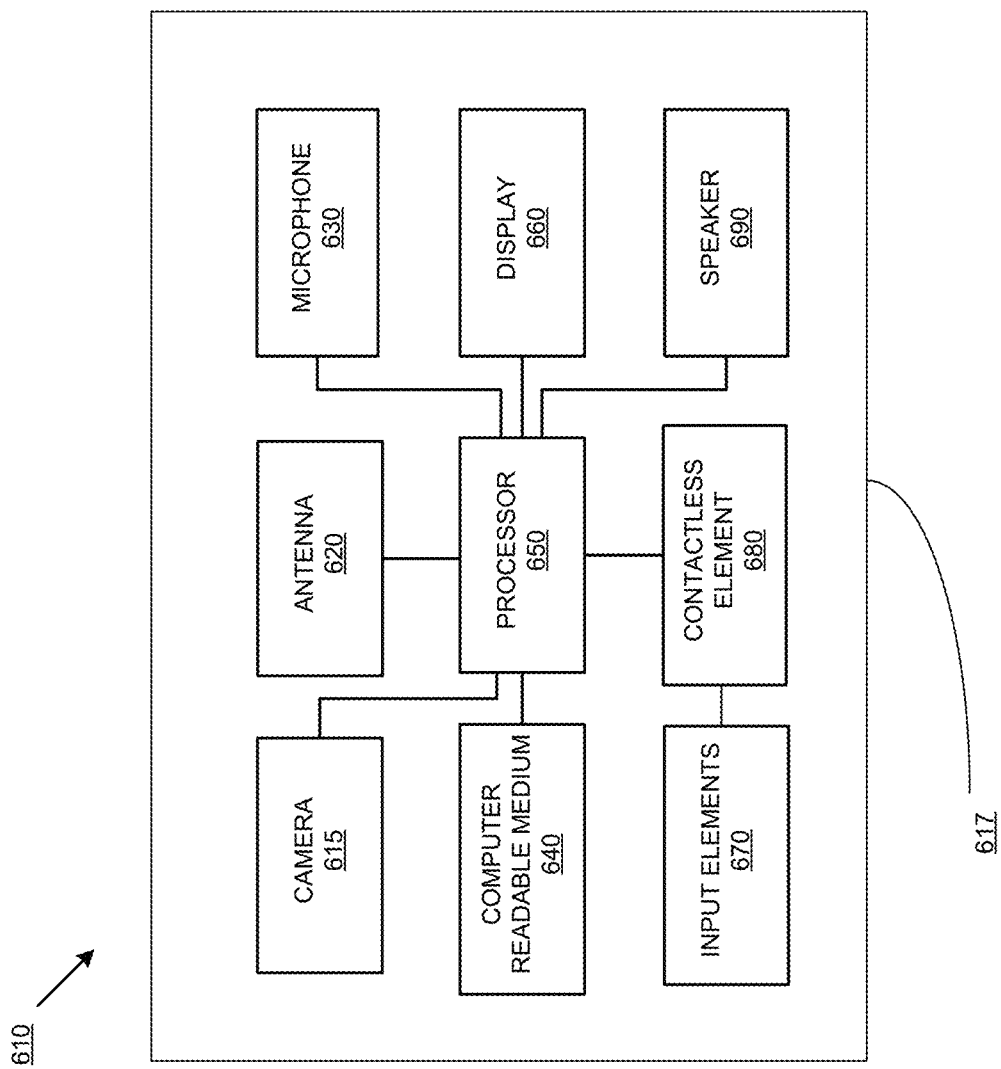
FIG. 6 shows a block diagram of an exemplary mobile device usable with system and methods according to embodiments of the present invention.

FIG. 6 shows a block diagram of an exemplary mobile device 600 that may be used in some embodiments. In some embodiments, the mobile device 600 may be a notification device that can receive alert messages, a payment device that can be used to make payments, an access device (e.g., POS device) that may receive information from a consumer to conduct a transaction, and/or a multi-purpose general use device. The exemplary mobile device 600 may comprise a computer readable medium 640 that be present within the body (or outer casing) 617, or the computer readable medium 640 could be detachable from the device (e.g. the computer readable medium 640 could comprise an external memory that could be connected through a physical interface such as a USB connection, or the data could be hosted remotely and accessed wirelessly by the device—e.g. the data could be hosted and stored at a remoter server in the "cloud"). The computer readable medium 640 may be in the form of a memory that stores data. The memory may store information such as financial information, transit information (e.g., as in a subway or train pass), access information (e.g., access badges), serial numbers, mobile account information, and any other suitable information. In general, any of this information may be transmitted by the mobile device 600 (such as to an access device), via any suitable method, including the use of antenna 620 or contactless element 680. The body 617 may be in the form a plastic substrate, housing, or other structure.

In some embodiments, the mobile device 600 may further include a contactless element 680, which is typically implemented in the form of a semiconductor chip (or other data storage element) with an associated wireless transfer (e.g., data transmission) element, such as an antenna 620. Contactless element 680 may be coupled to (e.g., embedded within) the mobile device 610 and data or control instructions that are transmitted via a cellular network may be applied to the contactless element 680 by means of a contactless element interface (not shown). The contactless element interface functions to permit the exchange of data and/or control instructions between the mobile device circuitry and an optional contactless element 680, or between another device having a contactless element (e.g. a POS terminal or a payment device). Contactless element 680 may be capable of transferring and receiving data using a short range wireless communication capability. As noted above, mobile device 610 may comprise components to both be the interrogator device (e.g. receiving data) and the interrogated device (e.g. sending data). Thus, the mobile device 610 may be capable of communicating and transferring data or control instructions via both cellular network (or any other suitable wireless network—e.g. the Internet or other data network) and short range communications.

The mobile device 610 may also include a processor 650 (e.g., a microprocessor) for processing the functions of the mobile device 610 and a display 660 to allow a consumer to see phone numbers and other information and messages. The mobile device 610 may further include input elements 670 to allow a user to input information into the device, a speaker 690 to allow the user to hear voice communication, music, etc., and a microphone 630 to allow the user to transmit her voice through the mobile device 610. The mobile device 610 may also include an antenna 620 for wireless data transfer (e.g., data transmission).

The mobile device 610 may also include a camera 615. The camera 615 may be able to capture images, such as an image of a value token. The mobile device 610 may be able to provide information representing an image captured with camera 615 to other entities.

VII. Example MSP

Figure 7:
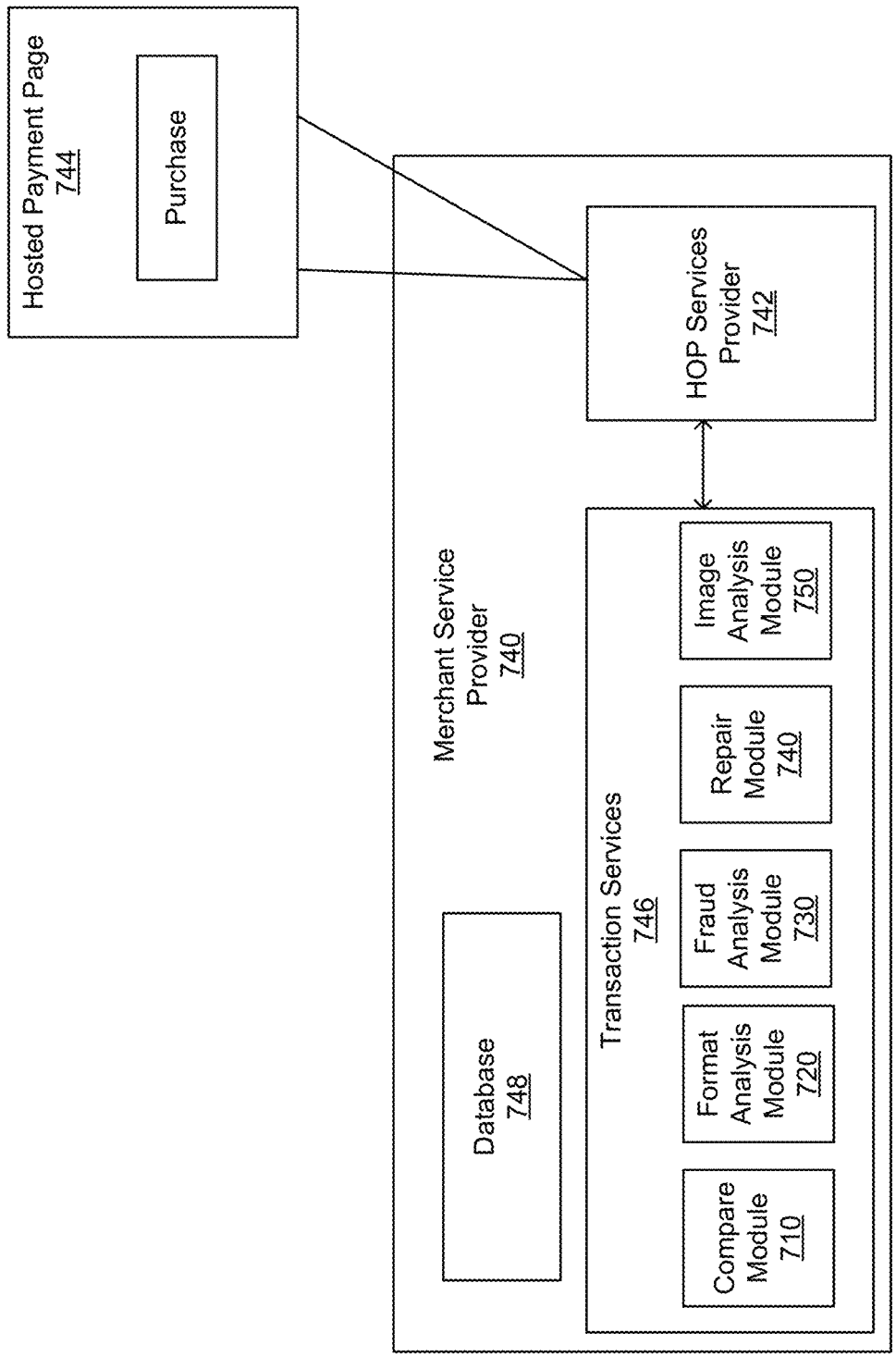
FIG. 7 shows a block diagram of a merchant service provider usable with system and methods according to embodiments of the present invention.

FIG. 7 shows a block diagram of an exemplary MSP 740 that may be used in some embodiments. In some embodiments, MSP 740 can provide one or more services a merchant. For example, MSP 740 can assist in processing transactions. MSP 740 may be able to handle consumer payment information on behalf of a merchant so that the merchant never receives or stores consumer payment information. In some embodiments, MSP 740 may be included in a clearinghouse.

MSP 740 can include HOP services provider 742 which can provide an HOP 744. HOP service provider 742 may receive information from a consumer device via a first connection, and may forward the information to other applications associated with MSP 740 (e.g. transaction services provider 746) via a first communication channel. In some embodiments, the first connection may also be considered a part of the first communication channel. HOP 744 may be able to provide information about a second communication channel to a consumer device. In some embodiments, MSP 740 may include an application programming interface (API) having an associated hosted payment page for the merchant, instead of or addition to HOP services provider 742.

Transaction services provider 746 can include compare module 710, format analysis module 720, fraud analysis module 730, repair module 740, and image analysis module 750. Transaction services provider 746 can provide one or more services to the merchant. For example, transaction services provider 746 can validate payment information as described herein. Transaction services provider 746 can receive information from HOP services provider 742 (originally sent by a consumer device) via the first communication channel, and can also receive information directly from a consumer device via a second communication channel. Transaction services provider 746 may also be able to send transaction information, merchant information, consumer payment information, and any other suitable information to an issuer bank (e.g. via an acquirer bank and a clearinghouse) for settlement and/or authorization purposes. Transaction services provider 746 and/or HOP 744 may inform the consumer and/or merchant of the transaction results (e.g. settlement outcome or authorization response).

Image analysis module 750 may be able to analyze data representing an image to determine any text included in the image (e.g. via OCR). Compare module 710 may be able to compare the first set of information and a second set of information in order to determine whether or not they match. Format analysis module 720 may be able to compare a set of payment information against payment information formatting standards and determine if it matches the formatting standards. Fraud analysis module 730 may be able to conduct a fraud analysis on a set of payment information. A plurality of fraud detection algorithms may be run to assess the risk associated with a transaction involving the payment information. Repair module 740 may be able repair the a first set of payment information based on a corresponding second set of payment information and/or a stored set of payment information.

MSP 740 may store information, such as consumer payment account information, formatting information, or any other suitable data at the database 748.

VIII. Computer System

Figure 8:
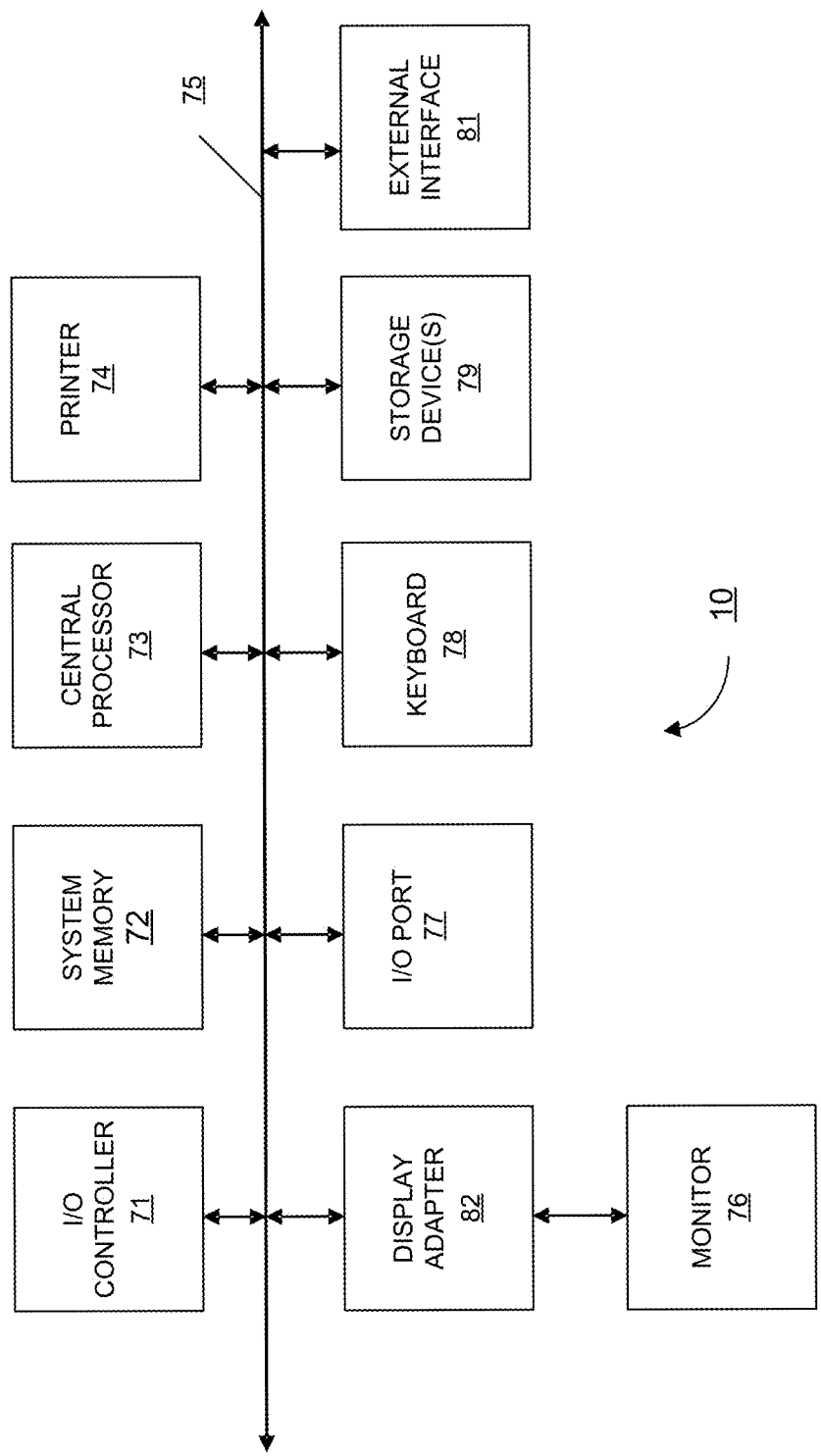
FIG. 8 shows a block diagram of an example computer system 10 usable with system and methods according to embodiments of the present invention.

Any of the computer systems mentioned herein may utilize any suitable number of subsystems. Examples of such subsystems are shown in FIG. 8 in computer apparatus 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 8 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C# or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned here are incorporated by reference in their entirety for all purposes. None is admitted to be prior art.

What is claimed is:

1. A method comprising:
   initiating, by a first device, a transaction with a merchant service provider computer over a first communication channel;
   displaying, by the first device, transaction information for the transaction with the merchant service provider computer, one or more payment input fields, and a selectable verification icon to a user of the first device;
   receiving, by the first device, first payment information, the first payment information being manually entered into the one or more payment input fields by the user;
   receiving, by the first device, an indication from the user to initiate a validation process, wherein the user generates the indication by selecting the selectable verification icon displayed to the user;
   receiving, by the first device, information relating to a second communication channel for communicating with the merchant service provider computer, wherein the second communication channel is different from the first communication channel;
   receiving, by the first device, instructions for opening a camera application of the first device;
   capturing, by the first device, an image of a value token using the camera application of the first device, the image of the value token comprising data relating to second payment information;
   sending, by the first device, the image of the value token to the merchant service provider computer over the second communication channel;
   sending, by the first device, the first payment information to the merchant service provider computer over the first communication channel to validate, by the merchant service provider computer, the first payment information based on a comparison and determination of a match or mismatch between the first payment information and the data relating to the second payment information; and
   receiving, by the first device, a message that the first payment information is validated and the transaction is authorized, wherein prior to submitting the first payment information to a payment processing network, the first payment information is validated by the merchant service provider computer that either: i) determines the first payment information and data relating to the second payment information match, or ii) repairs mismatch errors in the first payment information by replacing it with the data relating to the second payment information.

2. The method of claim 1, wherein the first communication channel comprises a first internet socket, and wherein the second communication channel comprises a second internet socket or an MMS messaging service.

3. The method of claim 2, wherein the image of the value token is a picture of a check.

4. The method of claim 2, wherein a server computer receives the first payment information over the first communication channel and the image of the value token over the second communication channel and validates the transaction on behalf of the merchant service provider computer.

5. The method of claim 4, wherein the first device comprises an application programming interface provided by an entity associated with the server computer.

6. The method of claim 1, where the image of the value token includes one or more of: a consumer's name, an address, a zip code, a phone number, a bank account number, a routing number, a coupon code, a card verification value, and/or a quick response code.

7. The method of claim 1, wherein the information relating to the second communication channel is provided by a second device.

8. The method of claim 1, wherein the comparison of the first payment information and the data relating to the second payment information comprises:
   comparing characters of the first payment information and characters of the second payment information; and
   determining that the first payment information and the second payment information match within a predetermined amount of mismatched characters.

9. The method of claim 8, further comprising:
   determining that the first payment information includes a routing number.

10. The method of claim 8, wherein the first payment information and the second payment information each comprise a bank account number.

11. The method of claim 10, further comprising:
    determining that the first payment information and the second payment information do not match; and
    replacing the first payment information with the second payment information.

12. The method of claim 11, further comprising:
    in response to determining that the first payment information and the second payment information do not match, assessing a risk associated with at least one of the first payment information and the payment second information;
    determining a ranking that represents the risk associated with the transaction, wherein the ranking is a risk score represented by a number conveying a probability of the transaction being fraudulent; and
    validating the first payment information and/or the payment second information.

13. A first device comprising:
    a non-transitory computer readable medium coupled to a processor, the non-transitory computer readable medium comprising code executable by the processor for implementing a method comprising:
    initiating, by the first device, a transaction with a merchant service provider computer over a first communication channel;
    displaying, by the first device, transaction information for the transaction with the merchant service provider computer, one or more payment input fields, and a selectable verification icon to a user of the device;
    receiving, by the first device, first payment information, the first payment information being manually entered into the one or more payment input fields by the user;
    receiving, by the first device, an indication from the user to initiate a validation process, wherein the user generates the indication by selecting the selectable verification icon displayed to the user;
    receiving, by the first device, information relating to a second communication channel for communicating with the merchant service provider computer, wherein the second communication channel is different from the first communication channel;
    receiving, by the first device, instructions for opening a camera application of the first device;
    capturing, by the first device, an image of a value token using the camera application of the first device, the image of the value token comprising data relating to second payment information;

sending, by the first device, the image of the value token to the merchant service provider computer over the second communication channel;

sending, by the first device, the first payment information to the merchant service provider computer over the first communication channel to validate, by the merchant service provider computer, the first payment information based on a comparison and determination of a match or mismatch between the first payment information and the data relating to the second payment information; and receiving, by the first device, a message that the first payment information is validated and the transaction is authorized, wherein prior to submitting the first payment information to a payment processing network, the first payment information is validated by the merchant service provider computer that either: i) determines the first payment information and data relating to the second payment information match, or ii) repairs mismatch errors in the first payment information by replacing it with the data relating to the second payment information.

* * * * *

UNITED STATES PATENT AND TRADEMARK OFFICE
CERTIFICATE OF CORRECTION

PATENT NO. : 10,769,638 B2  
APPLICATION NO. : 15/811107  
DATED : September 8, 2020  
INVENTOR(S) : Bharathi Ramavarjula, Nimesh Parikh and Timothy Wright Page 1 of 1

It is certified that error appears in the above-identified patent and that said Letters Patent is hereby corrected as shown below:

In the Claims

In Claim 13, Column 26, Line 49, "of the device" should be –of the first device–

Signed and Sealed this  
Fifth Day of January, 2021

Andrei Iancu  
*Director of the United States Patent and Trademark Office*